(12) United States Patent
Klingenberg et al.

(10) Patent No.: US 10,918,101 B2
(45) Date of Patent: Feb. 16, 2021

(54) WATERFOWL CAPTURING ASSEMBLY AND SYSTEM

(71) Applicants: Jaden Klingenberg, George, IA (US); Caleb Terhark, George, IA (US); Lucas Nagel, George, IA (US); Parker Netten, George, IA (US); Landon Jumbeck, George, IA (US)

(72) Inventors: Jaden Klingenberg, George, IA (US); Caleb Terhark, George, IA (US); Lucas Nagel, George, IA (US); Parker Netten, George, IA (US); Landon Jumbeck, George, IA (US)

(*) Notice: Subject to any disclaimer, the term of this patent is extended or adjusted under 35 U.S.C. 154(b) by 0 days.

(21) Appl. No.: 16/447,434

(22) Filed: Jun. 20, 2019

(65) Prior Publication Data

US 2020/0396984 A1 Dec. 24, 2020

(51) Int. Cl.
*A01M 31/00* (2006.01)
*B63B 32/70* (2020.01)
*B63B 17/00* (2006.01)
*B63B 34/00* (2020.01)

(52) U.S. Cl.
CPC .......... *A01M 31/006* (2013.01); *B63B 32/70* (2020.02); *A01M 2200/00* (2013.01); *B63B 34/05* (2020.02); *B63B 2017/0054* (2013.01)

(58) Field of Classification Search
CPC ........... B63B 1/00; B63B 35/00; B63B 35/32; B63B 32/70; B63B 34/05; A01M 31/006
USPC ............................. 114/343, 362; 43/1, 26.1
See application file for complete search history.

(56) References Cited

U.S. PATENT DOCUMENTS

| | | | |
|---|---|---|---|
| 3,026,545 | A | 3/1962 | Brainard, II |
| 4,545,315 | A | 10/1985 | Becherer |
| 5,377,439 | A | 1/1995 | Roos |
| 7,452,462 | B2 | 11/2008 | Joliet |
| 2004/0025770 | A1 | 2/2004 | Saunoris |
| 2005/0178043 | A1 | 8/2005 | Markley |
| 2007/0006516 | A1 | 1/2007 | LaCriox, Jr. |
| 2017/0332621 | A1 | 11/2017 | Macias |

*Primary Examiner* — Lars A Olson (57) ABSTRACT

A waterfowl capturing assembly and system includes a bracket is removably attachable to a watercraft. A frame is attached to the bracket and extends forwardly therefrom. The frame includes a receiving space having a receiving opening directed forward of the base. A panel is positioned on the frame and forms a scoop extending across the receiving space. The panel is used to capture and hold waterfowl floating on a body of water such that the watercraft can be used to retrieve the waterfowl.

17 Claims, 7 Drawing Sheets

WATERFOWL CAPTURING ASSEMBLY AND SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to waterfowl retrieving device and more particularly pertains to a new waterfowl retrieving device for retrieving waterfowl, such as ducks, which have been shot and are floating in a body water. Such a device would allow the user to retrieve the waterfowl without having to personally enter the water.

(2) Description of Related Art Including Information Disclosed Under 37 CFR 1.97 and 1.98

The prior art relates to waterfowl retrieving device.

BRIEF SUMMARY OF THE INVENTION

An embodiment of the disclosure meets the needs presented above by generally comprising a bracket is removably attachable to a watercraft. A frame is attached to the bracket and extends forwardly therefrom. The frame includes a receiving space having a receiving opening directed forward of the base. A panel is positioned on the frame and forms a scoop extending across the receiving space. The panel is configured to capture waterfowl on a body of water.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 8 thereof, a new waterfowl retrieving device embodying the principles and concepts of an embodiment of the disclosure and generally designated by the reference numeral 10 will be described.

As best illustrated in FIGS. 1 through 8, the waterfowl capturing assembly 10 and system 10 generally comprises a bracket 12 that is removably attachable to a watercraft 14. The watercraft 14 may be any conventional type of watercraft but would typically be small with the largest suitable being those types of watercraft that are usable by one or two persons. However, more preferably the watercraft is a remote controlled watercraft 14. Any remote controlled watercraft 14 will suffice though typically it will have a length of less than 3.0 feet. The remote controlled watercraft 14 may be conventional and driven by an electric motor or an internal combustion engine and controlled with a wireless controller 16. Most typically the watercraft 14 will use an electric motor and one or more batteries, which may be rechargeable batteries, will power the electric motor.

The bracket 12 includes a base 18 that has a first lateral edge 20 and a second lateral edge 22. A first arm 24 and a second arm 26 are provided and each of the first second arms has a first end 28 and a second end 30. The first ends 28 each are attached to the base 18 such that the first 24 and second 26 arms extend rearward from the base 18. The first arm 24 is positioned adjacent to the first lateral edge 20 and the second arm 26 is positioned adjacent to the second lateral edge 22. The first 24 and second 26 arms may be movably attached to the base 18. The first ends 28 are releasably secured to the base 18 the first 24 and second 26 arms are laterally movable with respect to each other wherein distance between the first 24 and second 26 arms is adjustable. The first ends 28 may be secured with any conventional fastener, such as a set screw 32. Once in place, the first 24 and second 26 arms may frictionally engage the watercraft 14. While the bracket 12 could be fastened directly to the watercraft 14 this may not be necessary since the watercraft 14 will typically be moving forward only, thereby reducing the chances that the bracket 12 will lose grip on the watercraft 14. Furthermore, the bracket 12, and assembly 10 as a whole, may be water buoyant such that the watercraft 14 uses the bracket 12 for "docking" purposes so that the watercraft 14 can simply push the assembly 10 through a body of water. However, it should be understood that the bracket 12 may be secured to the watercraft 14 with fasteners or other conventional securing devices.

A frame 34 is attached to the bracket 12 and extends forwardly therefrom. The frame 34 includes a receiving space 36 having a receiving opening 38 directed forward of the base 12. The frame 34 includes a first leg 40 and a second leg 42 wherein the first 40 and second 42 legs extend forward so that the receiving space 36 is positioned between the first 40 and second 42 legs and the receiving opening 38 is positioned at terminal free ends 44 of the first 40 and second 42 legs. The first 40 and second 42 legs are angled away from each other as the first 40 and second 42 legs extend away from the base 12. As can be seen in the Figures, the bracket 12 and frame 34 may consist of tubular members, which are hollow, to increase buoyancy. Further, each portion described about, i.e. first 24 and second 26 arms, first 40 and second 42 legs and base 12, may include two sections of tubular members vertically positioned relative to each other to again increase buoyancy and prevent listing of the assembly 10 in water. A height from a bottom of the frame 34 and bracket 12 to a top of each would typically be between 3.0 inches and 9.0 inches. The bracket 12 and the frame 14 have a combined length of less 4.0 feet, while the frame 34 has a greatest width of between 2.0 feet and 5.0 feet.

A panel 46 is positioned on the frame 34 and forms a scoop extending across the receiving space 36. The panel 46 is configured to capture, for retrieval purposes, waterfowl 48 on the body of water 50 so that the waterfowl 48 is not lost after being shot. The panel 46 has a plurality of apertures 52 extending therethrough which generally allow free flow of water through panel 46. Thus, the panel 46 may be made of a mesh material. However, the mesh material may be comprised of a metallic material that is resiliently flexible so that it will retain its general shape. The panel 46 has a front edge 54 which is positioned adjacent to or below the bottom 56 of the frame 34. More specifically, the front edge 54 would typically lie in plane of the bottom 56 or be positioned below the bottom 56 of the frame 34. This will facilitate movement of the front edge 54 under the waterfowl 48 when the assembly 10 first engages the waterfowl 48 as it floats on the body of water 50. Moreover, the panel 46 may extend downwardly tom the top 58 of the frame 34 to form a rear wall 60 to keep the waterfowl 48 on the panel 46.

Figure 1:
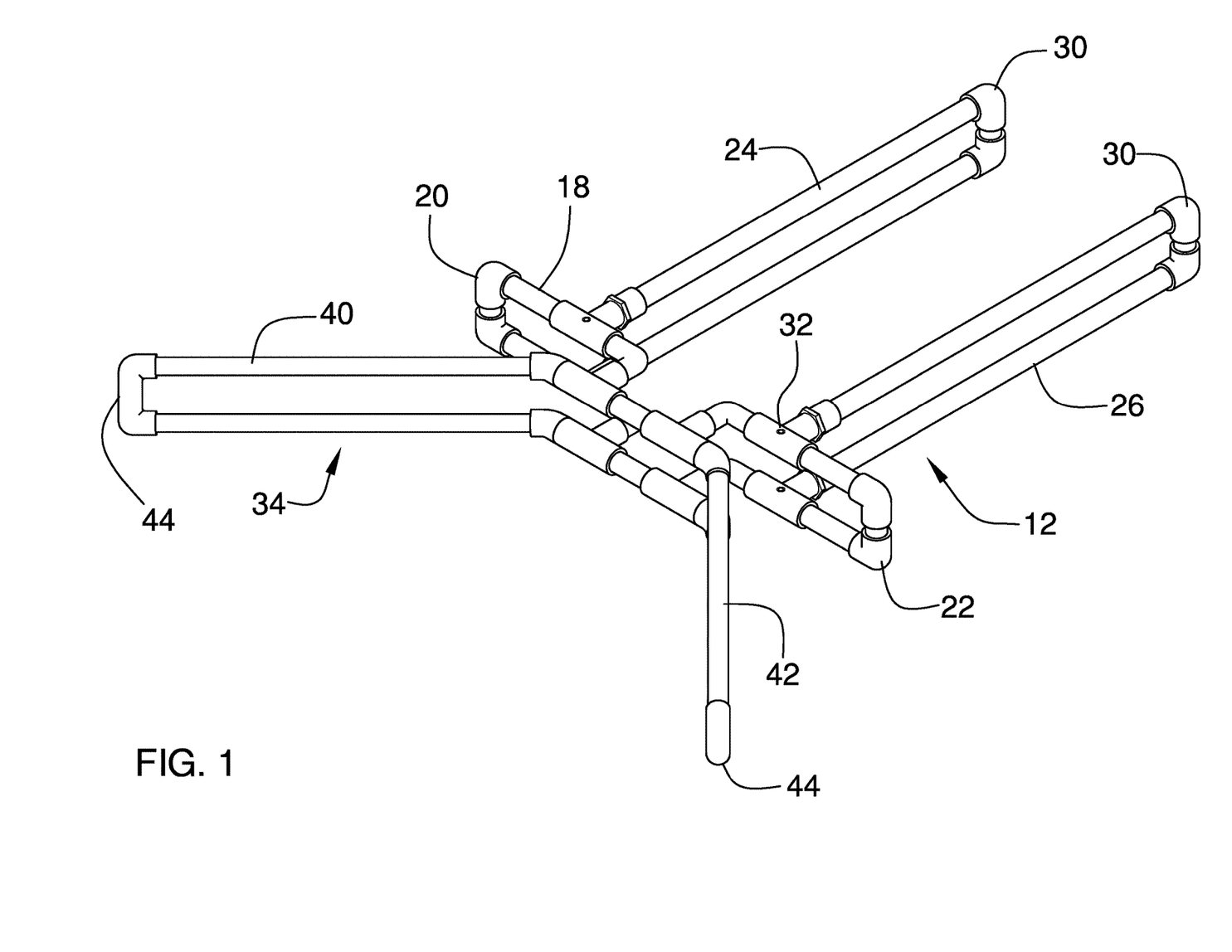
FIG. 1 is a front isometric view of a waterfowl capturing assembly and system according to an embodiment of the disclosure.
Figure 2:
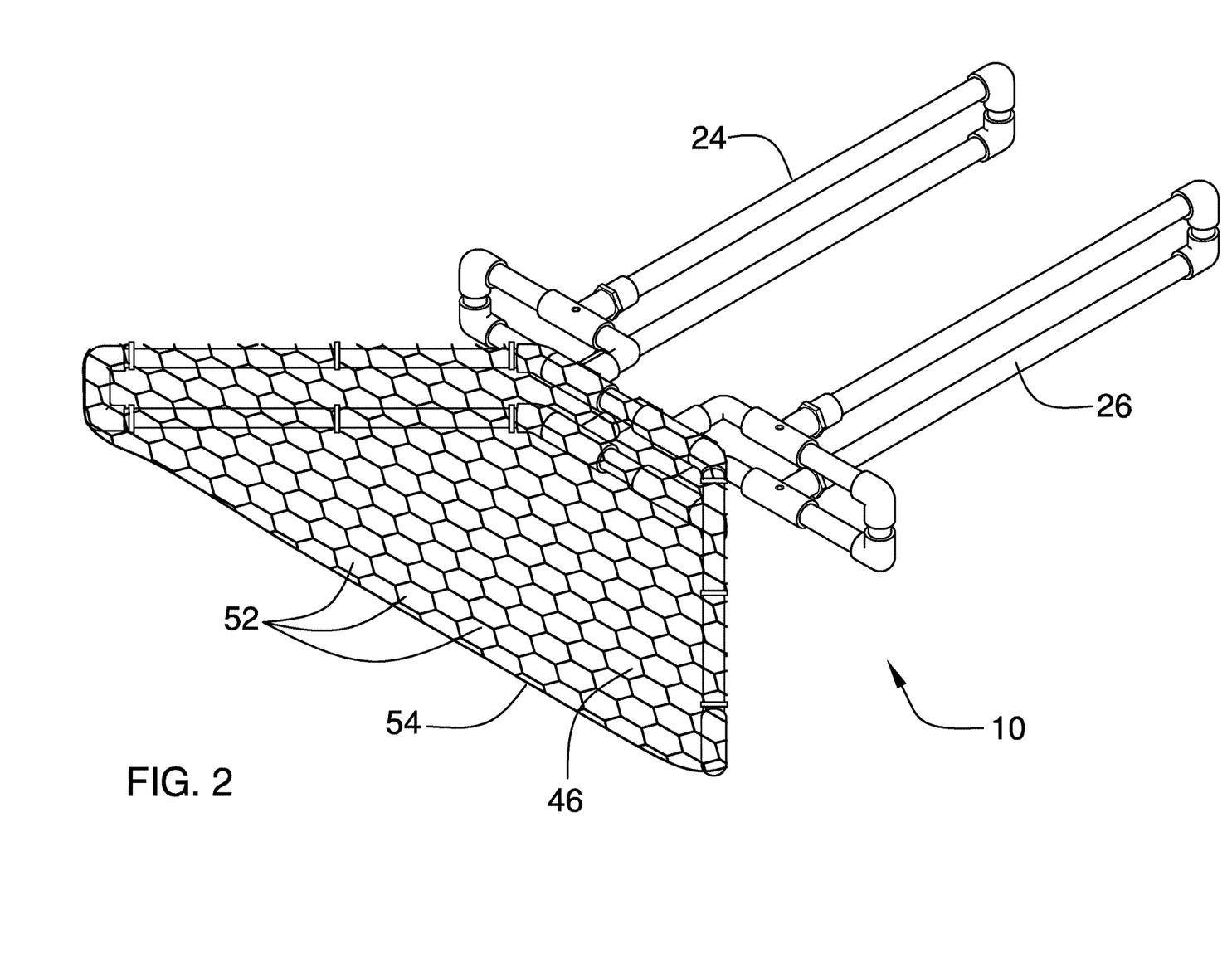
FIG. 2 is a front isometric view of an embodiment of the disclosure.
Figure 3:
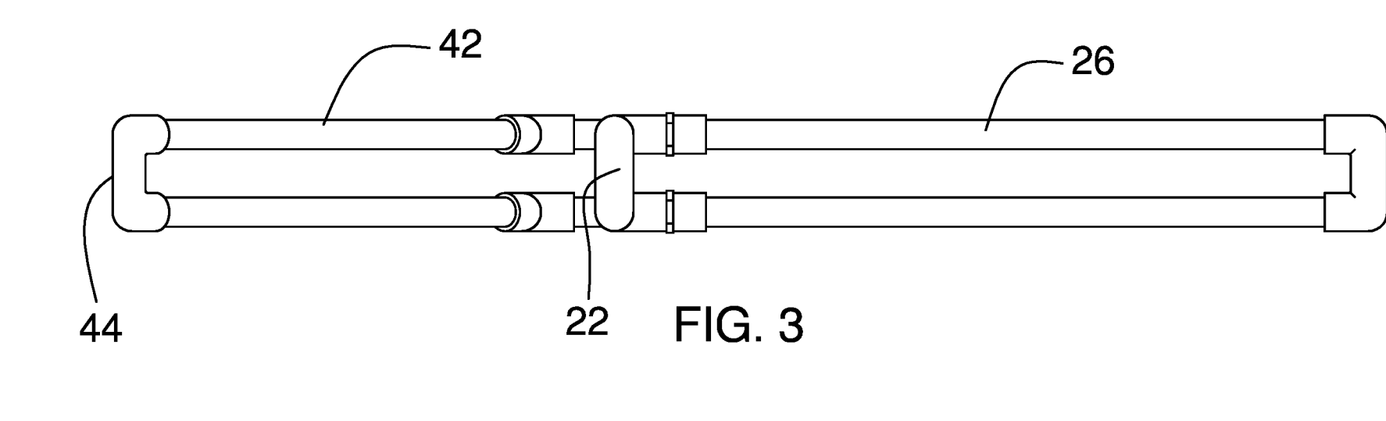
FIG. 3 is a side view of an embodiment of the disclosure.
Figure 4:
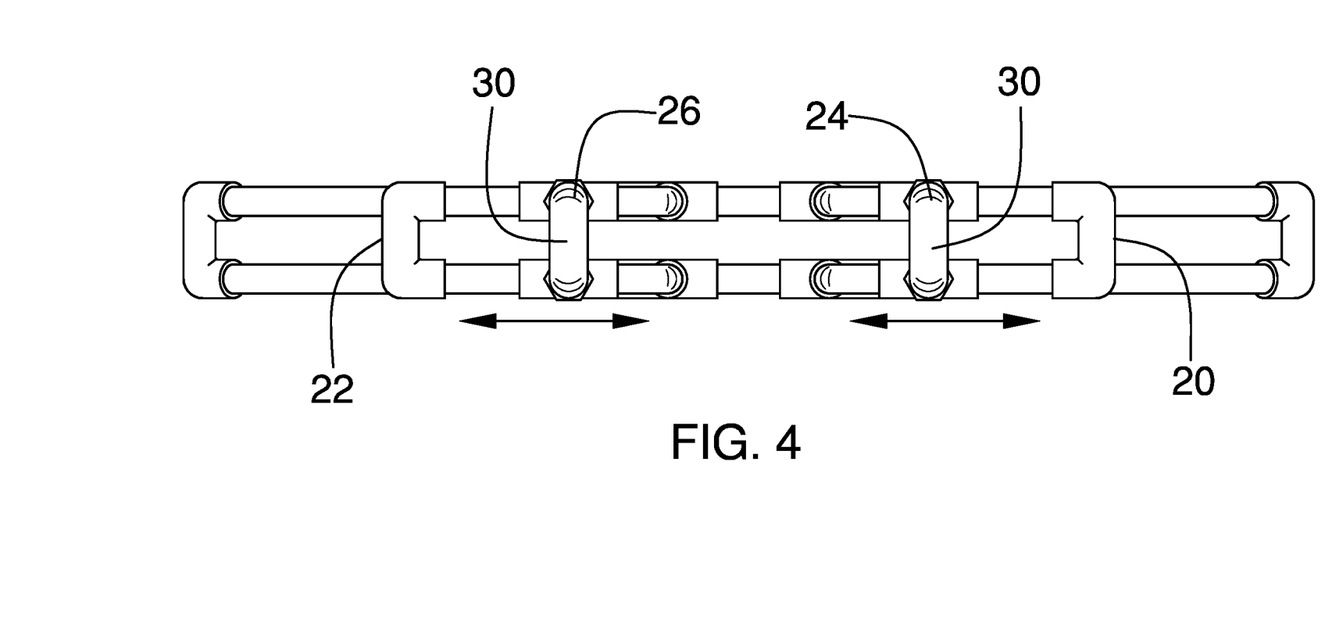
FIG. 4 is a rear view of an embodiment of the disclosure.
Figure 5:
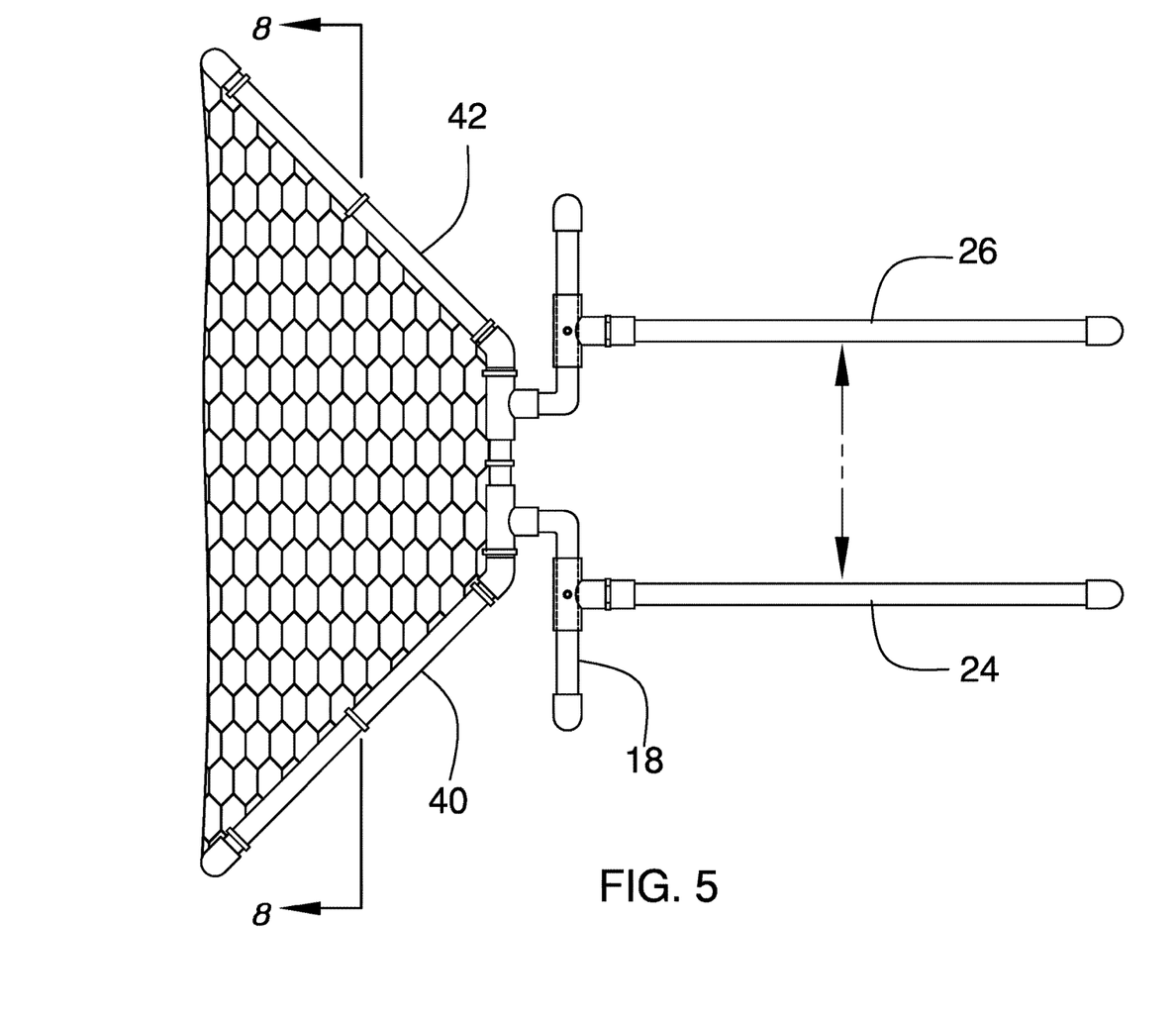
FIG. 5 is a bottom view of an embodiment of the disclosure.
Figure 6:
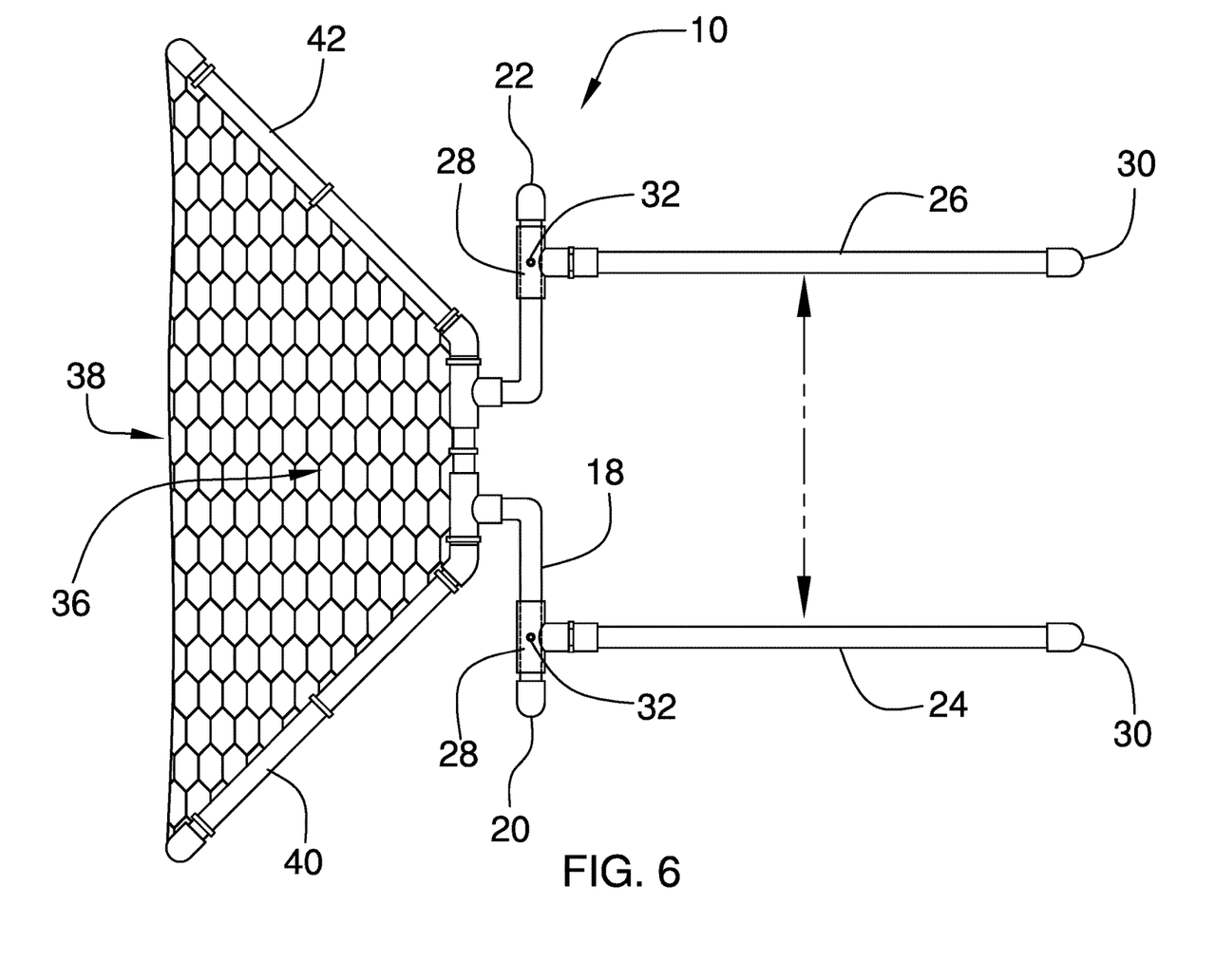
FIG. 6 is a bottom view of an embodiment of the disclosure.
Figure 7:
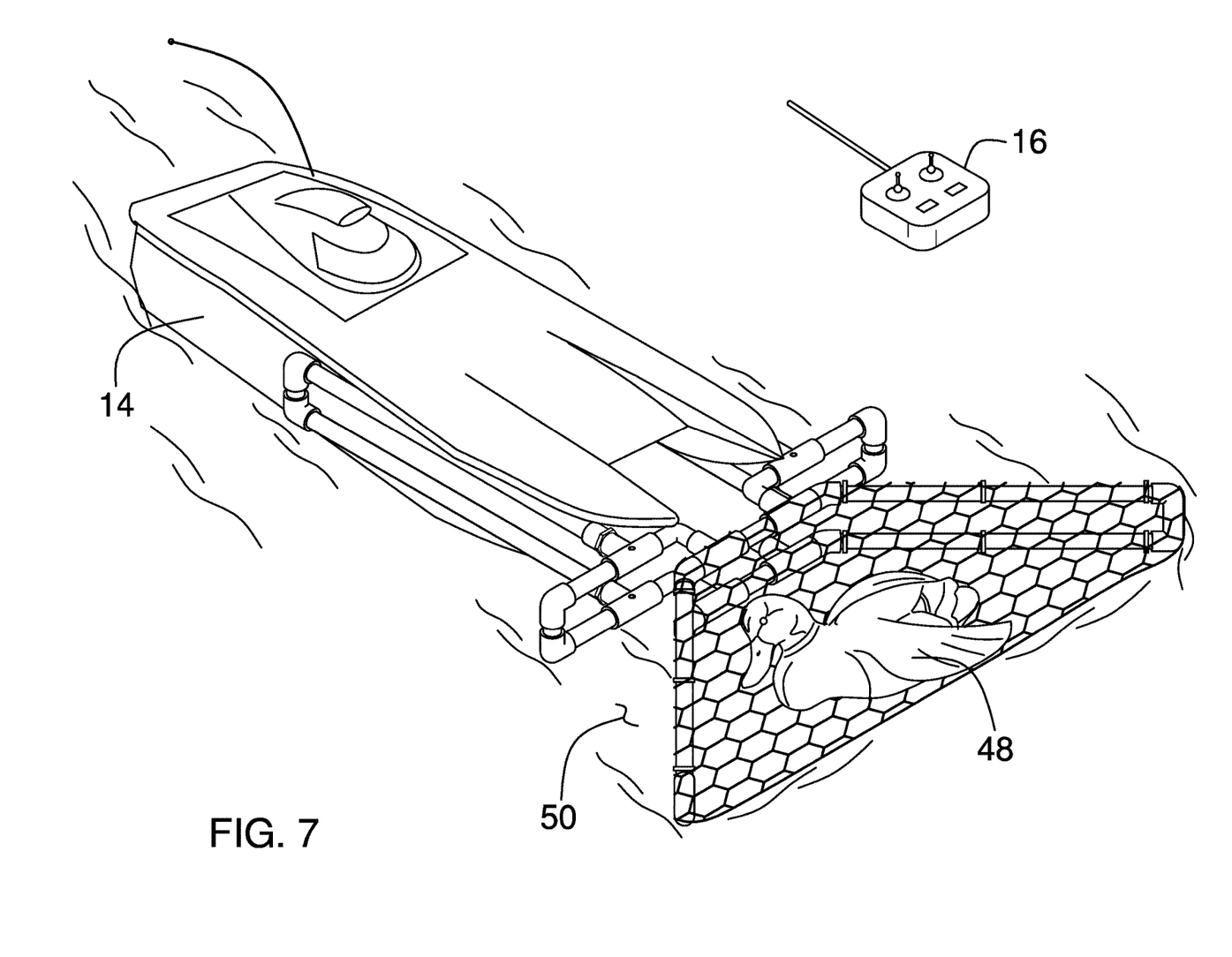
FIG. 7 is a front isometric in-use view of an embodiment of the disclosure.
Figure 8:
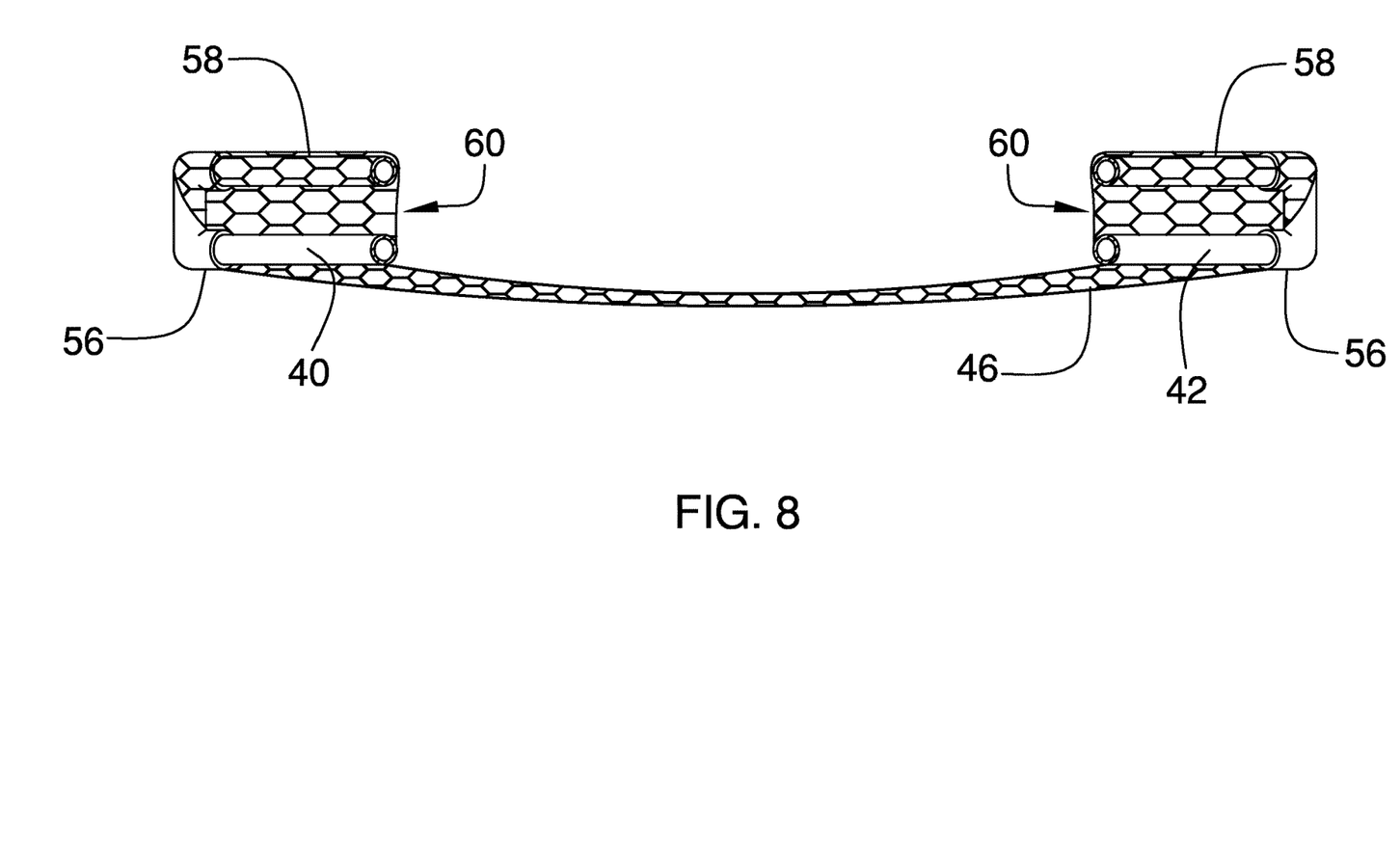
FIG. 8 is a cross-sectional view of an embodiment of the disclosure taken along line 8-8 of FIG. 5.

In use, the assembly 10 is allowed to float freely in the water 50 to be engaged by the watercraft 14 or secured to the watercraft 14 with the bracket 12, and with possibility other securing devices, so that the assembly 10 is forward of the watercraft 14. When a user of the assembly 10 shoots waterfowl 48 which fall into the water, such as a duck, the watercraft 14 is directed toward the waterfowl 48 so that waterfowl 48 is captured by the panel 46. The watercraft 14 is then directed or "driven" back toward the user so that the waterfowl 48 is retrieved without the user having to enter water 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A waterfowl capturing assembly configured to be mounted on a watercraft to retrieve waterfowl floating on a body of water, the assembly comprising:
    a bracket being removably attachable to a watercraft, wherein the bracket includes
        a base having a first lateral edge and a second lateral edge, and
        a first arm and a second arm, each of the first and second arms having a first end and a second end, the first ends each being attached to the base such that the first and second arms extend rearward from the base, the first arm being positioned adjacent to the first lateral edge and the second arm being positioned adjacent to the second lateral edge, the first and second arms being positionable on opposite sides of the watercraft and gripping the watercraft;
    a frame being attached to the bracket and extending forwardly therefrom, the frame including a receiving space having a receiving opening directed forward of the base; and
    a panel being positioned on the frame, the panel forming a scoop extending across the receiving space and being configured to capture the waterfowl on the body of water.

2. The waterfowl capturing assembly according to claim 1, wherein the first and second arms are movably attached to the base, the first ends being removably secured to the base such that a distance between the first and second arms is adjustable.

3. The waterfowl capturing assembly according to claim 1, wherein the frame includes a first leg and a second leg, the first and second legs extending forward wherein the receiving space is positioned between the first and second legs.

4. The waterfowl capturing assembly according to claim 3, wherein the first and second legs are angled away from each other as the first and second legs extend away from the base.

5. The waterfowl capturing assembly according to claim 1, wherein the panel has a plurality of apertures extending therethrough.

6. The waterfowl capturing assembly according to claim 1, wherein the bracket and the frame have a combined length of less 4.0 feet, the frame having a greatest width of between 2.0 feet and 5.0 feet.

7. A waterfowl capturing assembly configured to be mounted on a watercraft to retrieve waterfowl floating on a body of water, the assembly comprising:
- a bracket being removably attachable to a watercraft, the bracket including:
  - a base having a first end and a second end;
  - a first arm and a second arm, each of the first and second arms having a first end and a second end, the first ends each being attached to the base such that the first and second arms extend rearward from the base, the first arm being positioned adjacent to the first lateral edge and the second arm being positioned adjacent to the second lateral edge;
  - the first and second arms being movably attached to the base, the first ends being releasably secured to the base such that a distance between the first and second arms is adjustable;
- a frame being attached to the bracket and extending forwardly therefrom, the frame including a receiving space having a receiving opening directed forward of the base, the frame including a first leg and a second leg, the first and second legs extending forward wherein the receiving space is positioned between the first and second legs, the first and second legs being angled away from each other as the first and second legs extend away from the base;
- a panel being positioned on the frame, the panel forming a scoop extending across the receiving space and being configured to capture the waterfowl on the body of water, the panel having a plurality of apertures extending therethrough; and
- the bracket and the frame having a combined length of less 4.0 feet, the frame having a greatest width of between 2.0 feet and 5.0 feet.

8. A waterfowl capturing system comprising:
- a watercraft, the watercraft being a remote controlled watercraft;
- a bracket being attached to the watercraft, wherein the bracket includes
  - a base having a first end and a second end, and
  - a first arm and a second arm, each of the first and second arms having a first end and a second end, the first ends each being attached to the base such that the first and second arms extend rearward from the base, the first arm being positioned adjacent to the first lateral edge and the second arm being positioned adjacent to the second lateral edge, the first and second arms are positioned on opposite sides of the watercraft and grip the watercraft;
- a frame being attached to the bracket and extending forwardly therefrom, the frame including a receiving space having a receiving opening directed forward of the base; and
- a panel being positioned on the frame, the panel forming a scoop extending across the receiving space and being configured to capture waterfowl positioned on a body of water.

9. The waterfowl capturing system according to claim 8, wherein the first and second arms are movably attached to the base, the first ends being releasably secured to the base such that a distance between the first and second arms is adjustable.

10. The waterfowl capturing system according to claim 8, wherein the frame includes a first leg and a second leg, the first and second legs extending forward wherein the receiving space is positioned between the first and second legs.

11. The waterfowl capturing system according to claim 10, wherein the first and second legs are angled away from each other as the first and second legs extend away from the base.

12. The waterfowl capturing system according to claim 8, wherein the panel has a plurality of apertures extending therethrough.

13. The waterfowl capturing system according to claim 8, wherein the bracket and the frame have a combined length of less 4.0 feet, the frame having a greatest width of between 2.0 feet and 5.0 feet.

14. The waterfowl capturing system according to claim 9, wherein the frame includes a first leg and a second leg, the first and second legs extending forward wherein the receiving space is positioned between the first and second legs.

15. The waterfowl capturing system according to claim 14, wherein the first and second legs are angled away from each other as the first and second legs extend away from the base.

16. The waterfowl capturing system according to claim 15, wherein the panel has a plurality of apertures extending therethrough.

17. The waterfowl capturing system according to claim 15, wherein the bracket and the frame have a combined length of less 4.0 feet, the frame having a greatest width of between 2.0 feet and 5.0 feet.

* * * * *